(12) United States Patent
Mayville

(10) Patent No.: US 10,838,285 B2
(45) Date of Patent: Nov. 17, 2020

(54) LOCKING HINGE MOUNT

(71) Applicant: Axon Enterprise, Inc., Scottsdale, AZ (US)

(72) Inventor: Wayne R. Mayville, Phoenix, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

(21) Appl. No.: 16/404,697

(22) Filed: May 6, 2019

(65) Prior Publication Data
US 2019/0339593 A1    Nov. 7, 2019

Related U.S. Application Data

(60) Provisional application No. 62/667,417, filed on May 4, 2018.

(51) Int. Cl.

| | |
|---|---|
| *G03B 17/00* | (2006.01) |
| *G03B 17/56* | (2006.01) |
| *F16C 11/10* | (2006.01) |
| *F16M 13/02* | (2006.01) |
| *F16M 13/04* | (2006.01) |
| *B60R 11/04* | (2006.01) |
| *B60R 11/00* | (2006.01) |

(52) U.S. Cl.
CPC ............ *G03B 17/561* (2013.01); *B60R 11/04* (2013.01); *F16C 11/10* (2013.01); *F16M 13/022* (2013.01); *F16M 13/04* (2013.01); *B60R 2011/0049* (2013.01); *B60R 2011/0085* (2013.01); *F16M 2200/024* (2013.01)

(58) Field of Classification Search
USPC ........................................................ 396/428
See application file for complete search history.

(56) References Cited

U.S. PATENT DOCUMENTS

| | | | | |
|---|---|---|---|---|
| 4,917,343 | A * | 4/1990 | Wainscott | A47B 23/06 248/284.1 |
| 5,125,131 | A * | 6/1992 | Leblanc | E05D 11/1007 16/329 |
| 7,495,849 | B2 * | 2/2009 | Heuser | G02B 7/003 359/808 |
| 8,925,153 | B1 * | 1/2015 | McGrath | E05D 11/1007 16/326 |
| 9,483,083 | B1 * | 11/2016 | Zaloom | G06F 1/1679 |
| 2004/0179891 | A1 * | 9/2004 | Watkins | F16C 11/10 403/96 |
| 2008/0109994 | A1 * | 5/2008 | Liao | B62B 3/12 16/319 |

(Continued)

*Primary Examiner* — Rodney E Fuller
(74) *Attorney, Agent, or Firm* — Andrew Graham

(57) ABSTRACT

A locking hinge device may be selectively engaged in accordance with different configurations between elements of the device. The elements may include a locking gear configured to travel along an axis to engage a receiving gear. The elements may include a second receiving gear to which the locking gear is engaged. A system comprising the locking hinge device may be locked at an opening angle between components of the system when elements of a locking hinge device are selectively engaged in a hinge of the system. The system may be a locking hinge system for a camera mount and the components may include a component configured to couple to a camera. The camera may be a body-wearable camera.

20 Claims, 9 Drawing Sheets

(56) References Cited

U.S. PATENT DOCUMENTS

| | | | |
|---|---|---|---|
| 2008/0277539 A1* | 11/2008 | Lee | F16M 11/08 |
| | | | 248/157 |
| 2011/0229121 A1* | 9/2011 | Kimball | G03B 17/566 |
| | | | 396/661 |
| 2012/0248048 A1* | 10/2012 | Wu | F16M 11/10 |
| | | | 211/26 |
| 2014/0259532 A1* | 9/2014 | Millard | E05D 11/1028 |
| | | | 16/326 |
| 2015/0169009 A1* | 6/2015 | Ghosh | G06F 1/1681 |
| | | | 361/679.27 |
| 2017/0295895 A1* | 10/2017 | Volin | A45B 17/00 |

* cited by examiner

LOCKING HINGE MOUNT

FIELD OF INVENTION

Embodiments of the present invention relate to devices and systems involving a locking hinge.

BRIEF SUMMARY

The following presents a simplified summary of the present disclosure in order to provide a basic understanding of some aspects of the embodiments disclosed herein. This summary is not an extensive overview of the invention. It is not intended to identify key or critical elements of the invention or to delineate the scope of the invention. The following summary merely presents some concepts of the invention in a simplified form as a prelude to the more detailed description provided below.

In embodiments, a locking hinge device comprises a first gear with first splines configured to travel along an axis, a second gear with second splines, and a third gear with third splines engaged with the first splines of the first gear, wherein a rotation of the locking hinge device about the axis is prevented when the first splines and second splines are selectively engaged. The third splines may prevent the first gear from rotating about the axis separately from the third gear. The first gear may be configured to travel along the axis when the second splines are aligned with the third splines. The first gear may be coupled to a first mount component via the third gear and the second gear may be integrated with a second mount component. The device may comprise a biasing device, wherein a force may be applied to a first end of the first gear along the axis in a first direction by the biasing device. The device may comprise a hinge tab provided at a second end of the first gear along the axis.

In embodiments, a locking hinge system may comprise a first mount component, a second mount component, and a locking hinge device including a first gear with first splines configured to travel along an axis, a second gear with second splines, and a third gear with third splines engaged with the first splines of the first gear, wherein a rotation of the first mount component and the second mount component about the axis may be prevented when the first splines and second splines are selectively engaged. The first mount component may be a camera mount component configured to couple to a camera. The second mount component may be configured to couple to a clothing mount or a vehicle mount. The system may comprise a second locking hinge device. The second locking hinge device may comprise a fourth gear with fourth splines. The second locking hinge device may comprise a fifth gear with fifth splines, wherein rotation of the first mount component and the second mount component about the axis may be prevented when the fourth splines and fifth splines are selectively engaged. The second gear and the fifth gear may both be physically integrated with one of the first mount component and the second mount component. The second splines may be provided at a first angle about the axis and the fifth splines may be provided at a second angle about the axis. The first angle may be a same angle or a different angle from the second angle. The first and second splines may be configured to be engaged at one or more first angles about the axis and the fourth and fifth splines may be configured to be engaged at one or more second angles about the axis, the first angles different from the second angles. The first and fourth gears may be configured to be separated along the axis by at least a first distance when the first and second spines are selectively engaged or the fourth and fifth splines are selectively engaged. The first and fourth gears may be configured to be separated along the axis by less than the first distance when both the first and second splines are not selectively engaged and the fourth and fifth splines are not selectively engaged. The second locking hinge device may include a sixth gear with sixth splines engaged with the fourth splines. The third gear and the sixth gear may be both physically integrated with one of the second mount component and the first mount component. The second and fifth splines may be aligned with each other about the axis. The third and sixth splines may be aligned with each other about the axis. The system may comprise a biasing device along the axis, positioned to provide a force along the axis to each of the first and fourth gears.

In embodiments, a locking hinge system for a camera mount may comprise a first mount component configured to be coupled to a camera and a second mount component configured to be coupled to one of a clothing mount and a vehicle mount. The locking hinge system may comprise a first locking hinge device including a first locking gear configured to travel along an axis and a first receiving gear configured to selectively engage the first locking gear, wherein rotation of the first mount component and the second mount component about the axis is prevented when the first locking gear and first receiving gear are selectively engaged. The locking hinge system may comprise a second locking hinge device including a second locking gear configured to travel along the axis and a second receiving gear configured to selectively engage the second locking gear, wherein rotation of the first mount component and the second mount component about the axis is prevented when the second locking gear and second receiving gear are selectively engaged. The first locking gear may be configured to selectively engage the first receiving gear in a first direction along the axis and the second locking gear may be configured to selectively engage the second receiving gear in a second direction along the axis, the first direction opposite the second direction.

BRIEF DESCRIPTION OF THE SEVERAL VIEWS OF THE DRAWINGS

Embodiments of the present invention will be described with reference to the drawings, wherein like designations denote like elements, and.

DETAILED DESCRIPTION

Figure 1:
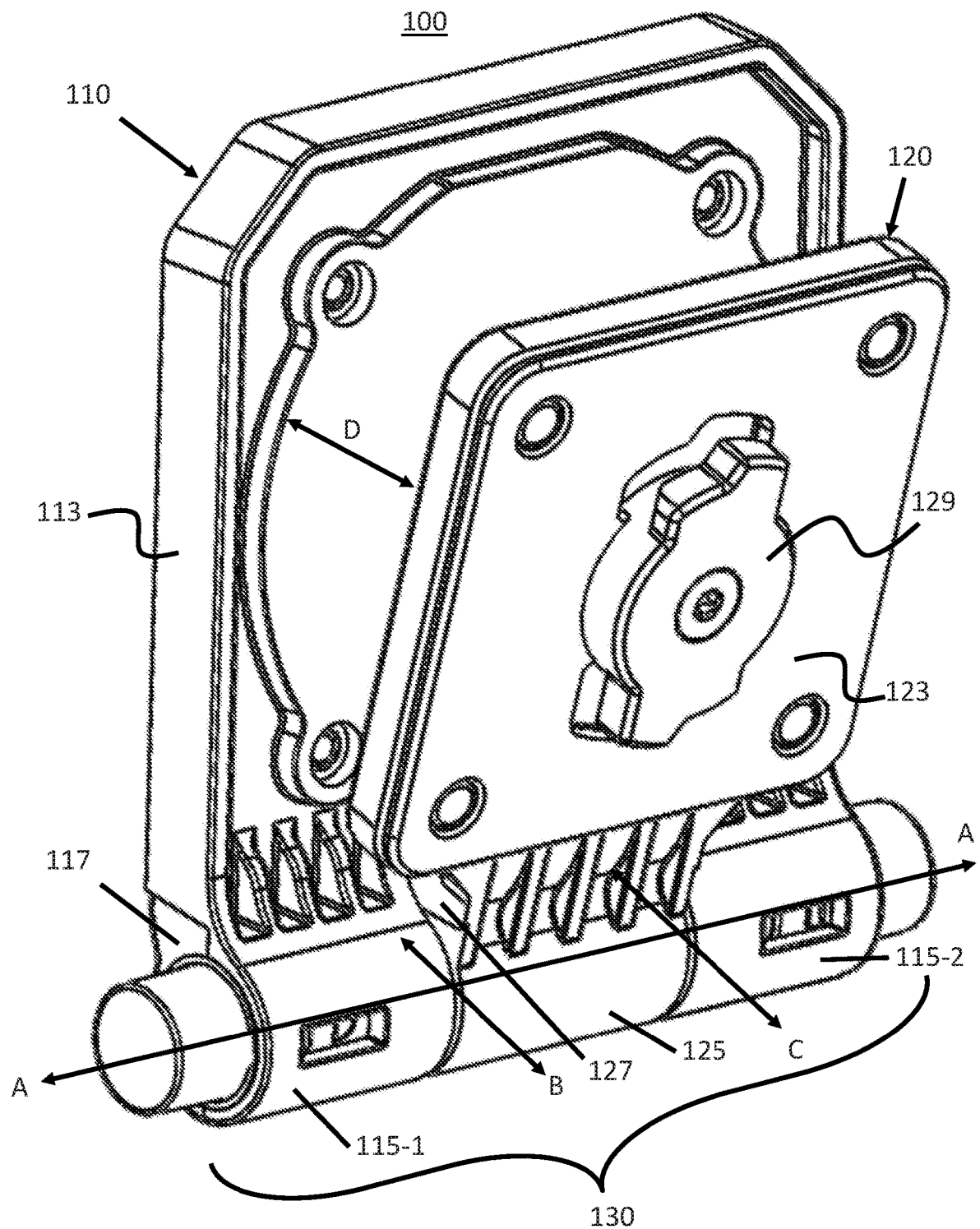
FIG. 1 is a diagram of an example system comprising a locking hinge according to various aspects of the present disclosure.

Selectively locked hinges are desirable for many applications. These applications particularly include camera mounts for body-worn or body-wearable cameras. A body-worn or body-wearable camera may capture a field of view depending on an angle at which the camera is oriented by a mount. An angle at which the camera should be oriented may vary depending on a position at which the camera is mounted on an object. For example, a camera mounted to a shirt near a shoulder of a user may need to be oriented at an acute angle away from the shirt to capture a field of view in a forward direction. A camera mounted to the shirt near a sternum of a user may need to be oriented parallel or at a zero-degree angle relative to the shirt to capture a field of view in the forward direction. A locking hinge may enable each angle in these examples to be attained by a same camera mount. A locking hinge may permit a user to change positions at which the camera is mounted without a need for a different camera mount for each position. Rather, an angle of orientation appropriate for each position may be provided by a same mount with a locking hinge in embodiments according to various aspects of the present disclosure. Once the camera is oriented in a selected manner, it should be locked at an opening angle, resisting being reoriented upon contact, including intentional or incidental contact during use. Hinges that are compact in size are further desirable for applications involving wearable devices among others. A compact hinge may minimize a distance to which a camera and camera mount comprising the hinge protrude from an object to which the mount is attached.

In embodiments according to various aspects of the present disclosure, a system with a locking hinge may be provided. The system may include a locking hinge, a first component, and a second component. The hinge of the system may interconnect the first component and the second component. The first component of the system may rotate about an axis relative to the second component of the system via the hinge of the system. The axis may be defined by the hinge. The hinge may selectively lock the system in different positions. Each position may be associated with a different opening angle between the first component and the second component. The opening angle may be defined about the axis defined by the hinge of the system. The first component of the system may be positioned at the opening angle relative to the second component. The system may be a mount, wherein the first component is a mount component and the second component is also a mount component.

In embodiments, a component may include a mounting structure, a coupling element, and one or more barrel portions. A mounting structure may include a plate and may be rectangular and/or planar in shape. A barrel portion may have an opening that is at least partially enclosed by a cylindrical structure. A coupling element may include a key, post, receiver, coupler, bolt, or other mechanical fastener for attaching the component to another object. The mounting structure of the component may interconnect the coupling element and each of the one or more barrel portions of the component. The mounting structure may be connected to an elongated side of each of one or more of the one or more barrel portions, parallel to a central axis of an opening of the barrel portion.

In embodiments, the system may be a locking hinge system for a camera mount. A camera mount may attach (e.g., secure, mount, couple, etc.) a camera to another object. The camera may be a body-worn or body wearable camera configured to be attached to a body of a user. The camera may be portable. The camera may have an image sensor, wherein an angle of orientation of the image sensor may be determined in accordance with an opening angle at which the locking hinge system is selectively engaged. In embodiments, a system for capturing image data with an image sensor may further include the locking hinge system for a camera mount and a camera configured to be attached to the locking hinge system for a camera mount.

A first component in a locking hinge system for a camera mount may be a first mount component configured to be coupled to a camera. The first component may include a post, key, receiver, coupler, or other physical coupling element configured to mechanically couple the first component to the camera. The first component may have a physical coupling element that is complementary in shape relative to a coupling element of a camera. For example, a first component may have a receiver, while a camera may have a key configured to be received in the receiver to secure the camera to camera mount comprising the first component.

A second component in a locking hinge system for a camera mount may be a second mount component configured to be coupled to another object to which a camera may be mounted via the camera mount. For example, the other object may be one of a clothing mount and a vehicle mount. In embodiments, a camera mount may include a locking hinge system for the camera mount and one of a clothing mount and a vehicle mount.

A clothing mount may be secured, integrated, or otherwise attached to clothing. The clothing may include a shirt, jacket, or other wearable article of clothing. The clothing may include a piece of equipment wearable by a user. The user may be a law enforcement officer. The clothing mount may attach the second component to the clothing.

A vehicle mount may be secured, integrated, or otherwise attached to a vehicle. The vehicle may be a law enforcement vehicle equipped with law enforcement equipment, including one or more of a lightbar, spotlight, and mobile data terminal. The vehicle may be an automobile. The vehicle may be an unmanned aerial vehicle (UAV) or drone. The vehicle mount may attach the second component to the vehicle.

In embodiments, a second component may include a post, key, receiver, coupler, or other physical coupling element configured to mechanically couple the second component to the other object. The second component may have a physical coupling element that is complementary in shape relative to a coupling element of the other object. For example, a second component may have a key, while another object may have a receiver configured to receive the key in order to secure the second component to the other object.

In embodiments, a locking hinge may include various elements. The various elements may be disposed in different configurations, enabling the locking hinge to perform different functions. For example, rotation of the locking hinge may be enabled in one or more first configurations, while rotation of the locking hinge may be prevented in one or more second configurations. The locking hinge may be locked in the one or more second configurations. Elements of the hinge may be adjusted between different dispositions in accordance with different configurations. For example, a first element may be disposed at a first location in accordance with a locked configuration of the locking hinge and disposed at a second location in accordance with an unlocked configuration of the locking hinge. The first element may travel between the first and second locations. The first element may selectively travel between the first and second locations in accordance with one or more forces applied to the first element. The first element may be included in another element, such as a locking hinge device.

In embodiments, various elements of a locking hinge may include at least one locking hinge device, two or more barrel portions, and two or more angled neck portions. Each locking hinge device may be disposed within two or more of the two or more barrel portions. A barrel portion may be integrated with one or more locking hinge devices. For example, a barrel portion may be integrated with two locking hinge devices, wherein each locking hinge device is provided at a different end of the barrel portion. A locking hinge device may extend between two adjacent barrel portions.

Each barrel portion may be physically coupled to another object via an angled neck portion. For example, a first barrel portion of a hinge may be connected to a first component of a system via a first angled neck portion. Each barrel portion and may be physically integrated with the other object via the angled neck portion. Each angled neck portion may also be physically integrated with the other object. For example, an angled neck portion may include a portion of a mounting structure of a component proximate a barrel portion by which the barrel portion is attached to the mounting structure.

FIG. 1 shows an embodiment of a system according to various aspects of the present disclosure. This system 100 includes a locking hinge 130 which interconnects a first mount component 110 to a second mount component 120. The hinge 130 defines a central axis of rotation A. The hinge 130 enables each of components 110 and 120 to pivot about axis A. Component 110 may rotate relative to component 120 about axis A. The relative positions of components 110 and 120 about axis A define an opening angle D.

The mount component 110 includes two barrel portions 115 and a mounting structure 113. As shown in FIG. 1, the mounting structure 113 is planar and rectangular in shape. Mounting structure 113 is interconnected with each of two barrel portions 115. Each barrel portion 115 is hollow, cylindrical in shape and positioned at outer locations along axis A relative to a midpoint of axis A within locking hinge 130. Each barrel portion may be an outer barrel portion. A first barrel portion 115-1 is provided at an opposite end of locking hinge 130 relative to a second barrel portion 115-2. The mounting structure 113 is interconnected to each barrel portion by a respective angled neck structure. For example, mounting structure 113 is connected to first barrel portion 115-1 via angled neck structure 117. The angle of the angled neck structure 117 permits an inner surface of the mounting structure 113 at which opening angle D is defined to be co-planar or nearly co-planar with axis A. Other manners or structures of aligning axis A from a plane of an inner surface of the mounting structure 113 may also be employed in embodiments according to various aspects of the present disclosure. In other embodiments, a mounting structure may include different sizes and/or shapes of structures that integrate that mounting structure with a barrel portion, including those that do not include an angled neck structure, as well as those with an angled neck structure that offsets an inner surface of the mounting structure 113 away from a central axis such that the central axis is not co-planar with the inner surface of the mounting structure.

A second mount component may include a second mounting structure and at least one second barrel portion. Mount component 120 includes second mounting structure 123 and a second barrel portion 125. As shown in FIG. 1, the second barrel portion 125 of component 120 may form an inner barrel portion, positioned between first barrel portions 115 of component 110 along axis A. The second barrel portion 125 surrounds a midpoint of axis A within hinge 130, though other arrangements may be employed, including those in which one or more barrel portions of components 110 and 120 are asymmetrical and/or do not overlap the midpoint of axis A. The second mounting structure 123 is interconnected to the second barrel portion 125 by an angled neck structure 127. The angle of the neck structure 127 permits an inner surface of the second mounting structure 123 to be co-planar or nearly co-planar with axis A. Since the inner surfaces of the mounting structures 113,123 are each aligned with axis A, the inner surfaces may rotate against each other, such that the inner surface of component 110 abuts the inner surface of component 120. In such a position, the opening angle of the system 100 is zero degrees. A first barrel portion 115-1 of component 110 may abut an outer edge of a first end of the barrel portion 125 of component 120 along an axis B. A second barrel portion 115-2 of component 110 may abut an outer edge of a second end of the barrel portion 125 of component 120 along axis C as shown in FIG. 1.

Each of the mounting structures 113,123 may further include one or more coupling elements for attaching the system to respective secondary objects (not shown). A coupling element may be disposed on a mounting surface of a mounting structure, opposite an inner surface of the mounting structure. The secondary object may be a secondary device. For example, a mounting surface of component 110 may include one or more openings or receivers through which one or more keys, posts, fasteners, or other coupling elements may be provided. Similarly, a mounting surface of component 120 may include one or more keys, posts, fasteners or other raised coupling elements that enable the mounting surface to be securely attached to a secondary object. As shown in FIG. 1, mounting surface of mounting structure 123 includes a coupling element 129. Coupling element 129 is a key, configured to be received in a receiver of another object, such as a clothing mount or vehicle mount.

In many embodiments, at least one of the secondary devices is a camera. The camera may be a portable, body-worn type camera. In embodiments, another secondary device may be a clothing mount or a vehicle mount, such that the locking hinge system may be used to physically attach and orient a camera to and relative to an article of clothing, vehicle, or a surface of another object. While this is one specific application, others are contemplated and relevant to embodiments of the locking hinge according to various aspects of the present disclosure as well. For example, a locking hinge may interconnect other pairs of secondary objects, such as doors or other panels. In alternate embodiments, locking hinge systems according to various aspects of the present disclosure may include hinges for doors, hinges for gates, door locking arms, child proof cabinet hinges or other applications that utilize a hinge, which may include the releasable locking hinge concept disclosed herein.

As further discussed below, a hinge device according to various aspects of the present disclosure may be adjustably locked by selectively engaging various elements in the hinge device. A hinge device may include a selectively engaged locking gear and a receiving gear. The locking gear may be a male gear.

A locking gear may be an inner gear configured to be at least partially received in a receiving gear. The receiving gear may be female gear, configured to receive a locking gear in a concave region of the receiving gear. The receiving gear may be an outer gear configured to at least partially receive the locking gear. A receiving gear and locking gear may have a common axis along which the locking gear may selectively engage the receiving gear. A rotation of the hinge device may be enabled when the various elements are not selectively engaged, wherein the various elements include the locking gear and the receiving gear. A rotation of the hinge device may be prevented when the various elements are selectively engaged, the various elements including a locking gear and a receiving gear. The rotation may be a rotation about the axis of the locking gear and receiving gear. The locking gear may be selectively engaged with the receiving gear by travelling along the axis.

In embodiments, a receiving gear may be a first receiving gear and a locking hinge device may further include a second receiving gear. The second receiving gear may be a female gear. Both receiving gears in a locking hinge device may be outer gears, each configured to at least partially receive a locking gear in a concave portion of each respective outer gear. The second receiving gear may be engaged with the locking gear. The second receiving gear may be permanently engaged with the locking gear. The second receiving gear may permit, guide or otherwise enable travel of the locking gear along an axis. The second receiving gear may remain engaged with the locking gear while the locking gear travels along the axis. The second receiving gear may be engaged with the locking gear at each of a first position of the locking gear associated with a locked configuration of a hinge and a second position of the locking gear associated with an unlocked configuration of the hinge. The second receiving gear may prevent rotation of the locking gear about the axis separate from rotation of the second receiving gear. The second receiving gear may be rotationally coupled to the locking gear. The locking gear may be coupled to another component via the second receiving gear. The other component may be a same component in which the second receiving gear is integrated.

In embodiments, each receiving gear may be integrated with a barrel portion of a component. Each receiving gear may be integrated into an inner surface of an opening of the barrel portion. Two receiving gears may be integrated with a same barrel portion of a component. Two receiving gears may be integrated with different barrel portions of different components. Two receiving gears may be integrated with different barrel portions of a same component.

In embodiments, a receiving gear and a locking gear each include one or more splines. A spline may include an elongated projection or tooth. The locking gear may have first splines along a convex surface thereof, while a receiving gear may have splines along a concave surface thereof. Movement or travel of the locking gear along an axis may engage splines of the receiving gear with splines of the locking gear. Such engagement, while adjustable along the axis, may prevent rotation of the locking gear relative to the receiving gear about the axis. Such engagement may further prevent movement of a component coupled to a receiving gear. For example, a component with a receiving gear may be prevented from moving or rotating relative to the locking gear when the receiving gear and locking gear are engaged. A same locking gear engaged with two receiving gears of two components may prevent relative rotation of the two components. The locking gear may function as a pin of a hinge in which a hinge device with the locking gear is included.

In embodiments, two gears may be aligned or offset. For example, two receiving gears may be aligned when one or more splines or other regular surfaces of the gears are disposed at one or more same angles or directions about an axis. Two receiving gears may be offset when one or more splines or other regular surfaces of the gears are disposed at one or more different, second angles or directions about an axis. Offset receiving gears may prevent a locking gear from engaging both offset receiving gears at the same time. Aligned receiving gears may enable a locking gear to engage both receiving gear at the same time.

A locking gear and a receiving gear may be aligned when one or more splines or other regular surfaces of the locking gear are offset from one or more splines or regular surfaces of the receiving gear at one or more first predetermined angles about an axis. The predetermined angles may correspond to half of an interval angle between the splines or other regular surfaces of the locking gear or the receiving gear. The locking gear and receiving gear may be offset when one or more splines or other regular surfaces of the locking gear are aligned or at least partially aligned with one or more splines or regular surfaces of the receiving gear at one or more second angles or directions about an axis, different from the one or more first predetermined angles. An aligned locking gear and receiving gear may enable the locking gear to engage the receiving gear. An offset locking gear and receiving gear may prevent the locking gear from traveling into, being received by, or otherwise engaging the receiving gear.

In the example of FIG. 1, a first locking hinge device may be disposed between barrel portion 115-1 and barrel portion 125. A first receiving gear of the locking hinge device may be integrated with barrel portion 115-1, while a second receiving gear of the locking hinge device may be integrated with barrel portion 125. A locking gear of the first locking hinge device selectively engages the first receiving gear of barrel portions 115-1 while remaining engaged with a second receiving gear of barrel portion 125. The locking gear travels along axis A while guided by the receiving gear of barrel portion 125. The locking gear travels along axis A to selectively engage the receiving gear of barrel portion 115-1. Such engagement, while adjustable or selectable along axis A, prevents relative rotation of the locking gear with the selectively engaged first receiving gear about axis A. When engaged with the first receiving gear, the locking gear prevents motion of the first locking hinge device and prevents motion of the barrel portions 115-1, 125. In turn, this engagement prevents relative rotation of components 110, 120 in which barrel portions 115-1,125 are integrated. Components 110,120 are locked at a position when the locking gear is engaged with the receiving gear of barrel portion 115-1. In FIG. 1, the components 110, 120 are locked at a position with an associated opening angle D.

In embodiments, a second locking hinge device may be disposed between barrel portion 115-2 and barrel portion 125. A first receiving gear of the second locking hinge device may be integrated with barrel portion 115-2, while a second receiving gear of the second locking hinge device may be integrated with barrel portion 125. A locking gear of the second locking hinge device selectively engages the receiving gears of barrel portion 115-2 while remaining engaged with second receiving gear of barrel portion 125. The locking gear travels along axis A while guided by the receiving gear of barrel portion 125. The locking gear travels along axis A to selectively engage the receiving gear of barrel portion 115-2.

A locking gear of each first and second locking hinge device may travel along axis A to selectively engage a respective receiving gear of each locking hinge device. Such engagement, while adjustable or selectable along axis A, prevents relative rotation of a locking gear with a selectively engaged first receiving gear about axis A. Each locking gear may travel in opposite directions along axis A to selectively engage a receiving gear.

When engaged with a first receiving gear, a locking gear of the second locking hinge device prevents motion of the second locking hinge device and prevents motion of the barrel portions 115-2, 125. In turn, this engagement prevents relative rotation of components 110, 120 in which barrel portions 115-2,125 are integrated. Components 110,120 are locked at a position when the locking gear is engaged with the receiving gear of barrel portion 115-2. In FIG. 1, the components 110, 120 are locked at a position with an associated opening angle D. In embodiments, a locking hinge may be locked when a locking gear in either (e.g., just one, at least one, etc.) of a first or second locking hinge device is engaged with a corresponding receiving gear.

Movement of each locking gear along axis A may engage splines of a respective receiving gear in barrel portions 115 with splines of the corresponding locking gear. The locking gear in each locking hinge device in barrel portions 115,125 has first splines along a convex surface thereof, while the selectively engaged first receiving gear each hinge device in barrel portions 115,125 has splines along a concave surface thereof. Selective engagement may further prevent rotation of each barrel portion 115 relative to barrel portion 125. Selective engagement of a locking hinge device in either barrel portion 115-1, 115-2 may prevent rotation or movement of both barrel portions 115 relative to barrel portion 125. When engaged, the first and/or second hinge devices may further prevent rotations of components 110,120. A locking gear of each of the first and/or second hinge devices each serves as a pin of the hinge 130 formed with barrel portions 115,125 of the components 110 and 120.

A position of components of a system may affect whether a locking hinge device may be disposed in one or more configurations. For example, a locking hinge device may be configured to be disposed in a first configuration when components of the system are disposed in a first position, but the locking hinge device may not be configured to be disposed in the first configuration when components of the system are disposed in a second position. In the second position, the locking hinge device may be disposed or configured to be disposed in a second configuration. The first configuration may be a locked configuration and the second configuration may be an unlocked configuration. In the first position, splines of the locking hinge device may be aligned, while the splines may not be aligned in the second position. When the position of components corresponds to unaligned or offset splines, a locking gear of a locking hinge device may not engage splines of a first receiving gear of the locking hinge device. When the position of components corresponds to aligned splines, a locking gear of the locking hinge device may selectively engage splines of the first receiving gear of the locking hinge device.

Each different position of the components may correspond to a different opening angle for the components. At one or more first angles associated with different first positions of the components, a locking hinge device may be configured to be locked or disposed in a locked configuration, wherein splines of the locking hinge device may be selectively engaged. At one or more second angles of the different positions, the locking hinge device may be configured to be unlocked or disposed in an unlocked configuration, wherein splines of the locking hinge device may be prevented from being selectively engaged. The position of the components for a given system may be changed when the locking hinge device is disposed in an unlocked configuration, while changing the position of the components may be prevented with the locking hinge device is disposed in a locked configuration. Relative angular orientation of various elements of a locking hinge device, such as a receiving gear and locking gear, may be changed based on a change in position or relative rotation of the components about an axis. Examples of two positions of components according to various aspects of the present disclosure are further shown in FIG. 2 and FIG. 3.

Figure 2:
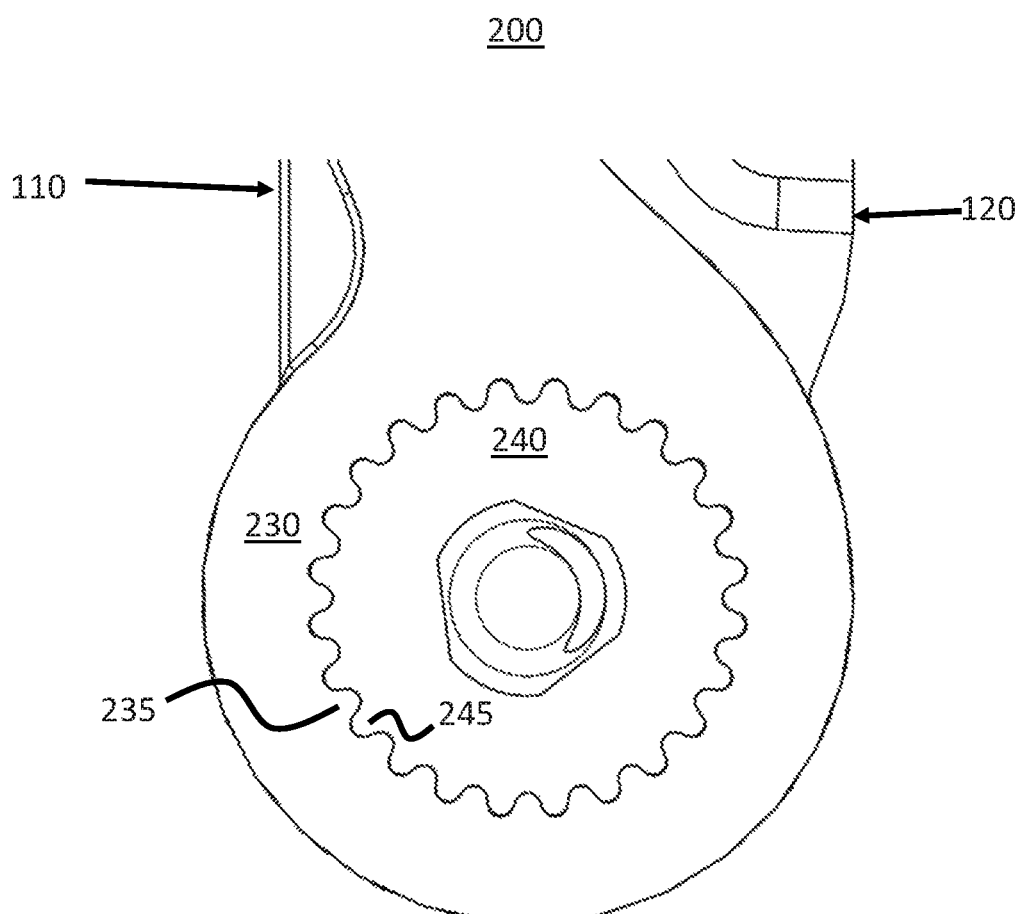
FIG. 2 is a side view of an example locking hinge device in a locked configuration according to various aspects of the present disclosure.
Figure 3:
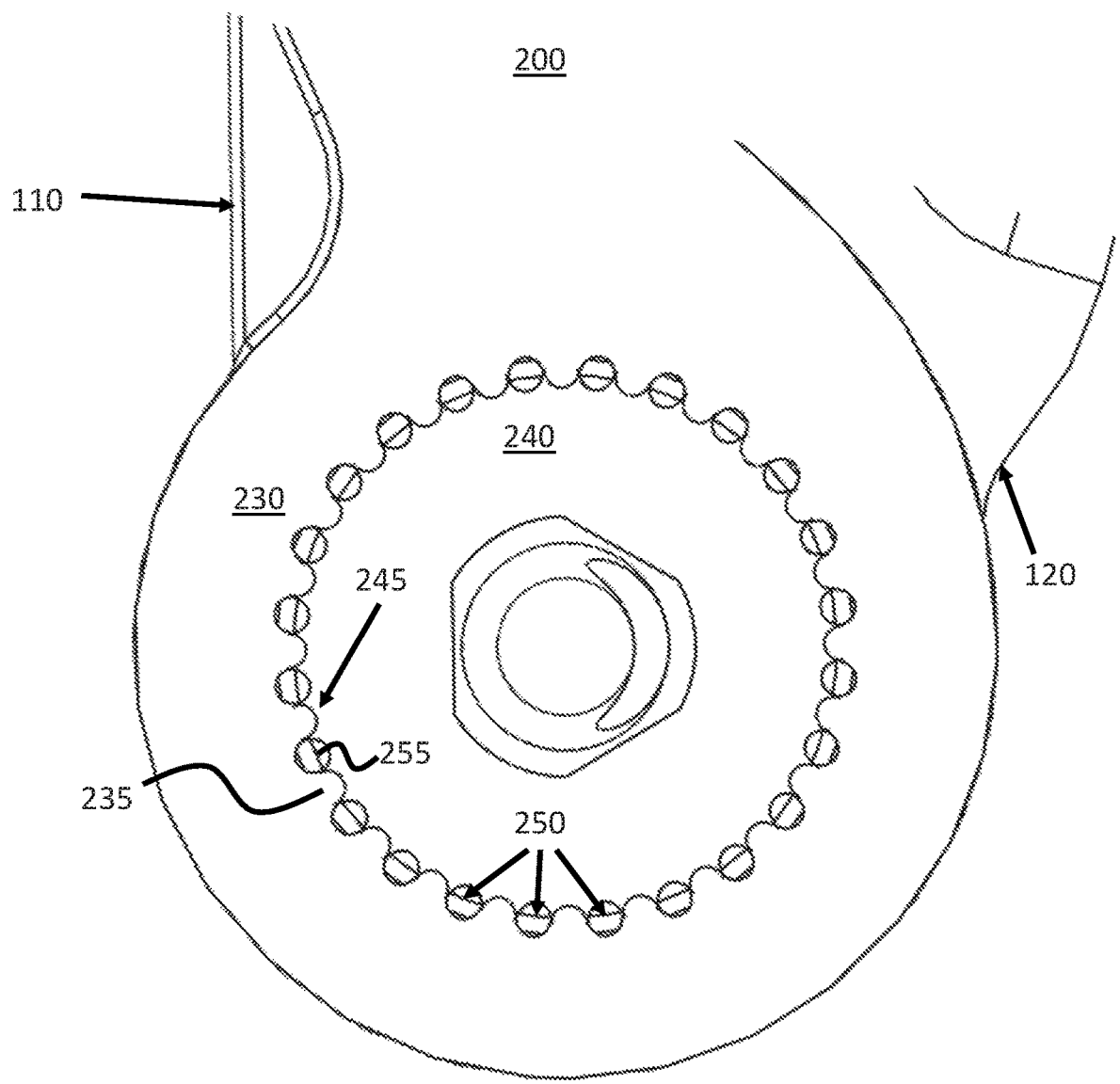
FIG. 3 is a side view of an example locking hinge device in an unlocked configuration according to various aspects of the present disclosure.

Side views of two positions associated with relative rotations of mounting components according to various aspects of the present disclosure are shown in FIG. 2 and FIG. 3. Both views illustrate an example of a hinge device and a subset of a system along axis A. Certain elements of an overall system are not shown in these figures, so that other elements such as a receiving gear 230 and a locking gear 240 may be viewed. FIG. 3 may correspond to a cross-section taken along axis E shown in FIG. 4.

In FIG. 2, a system 200 is shown in a locked position. System 200 includes first component 110, second component 120, and a locking hinge device. The locking hinge device comprises receiving gear 230 and locking gear 240. Receiving gear 230 includes a plurality of splines such as spline 235. Locking gear 240 includes a plurality of splines such as spline 245. Locking gear 240 is a male gear, while receiving gear 230 is a female gear. Receiving gear 230 is integrated with component 110. Component 120 is integrated with a second receiving gear 250 of the locking hinge device as further shown in FIG. 3.

In the example embodiment of FIG. 2, system 200 is locked at an opening angle of zero degrees. This is shown by the parallel orientation of outer, mounting surfaces of mounting structures of components 110 and 120. In FIG. 2, the splines of the receiving gear 230 and locking gear 240 are aligned.

In such a relative position or rotation, the locking gear 240 may be biased by a spring or other biasing device toward and into the receiving gear 230 to be received by receiving gear 230. Gear 240 may be biased out of or perpendicular to a plane of FIG. 2. A biasing force applied to gear 240 may prevent an opening angle and position of components 110, 120 from being changed.

In the illustrated position, splines of the two gears 230, 240 are engaged and prevent the receiving gear 230 from rotating separately from locking gear 240. For example, spline 235 of gear 230 is directly engaged with spline 245 of gear 240. As shown, an opening angle of zero degrees corresponds to an angle of rotation between spline 235 and spline 245 in which these splines 235,245 are directly engaged with each other. This engagement of selectively engageable gears 230,240 also prevents rotation of component 110 relative to component 120.

In this position, the locking gear 240 is provided along axis A within both a first, outer receiving gear 230 and a second, inner receiving gear 250 further shown in FIG. 3. The second receiving gear 250 is not visible in FIG. 2, as it is positioned behind outer receiving gear 230 from the shown perspective. In this angular position, one or more splines of receiving gear 230 are aligned with one or more splines of receiving gear 250. This permits one or more splines adjacent to these aligned splines to travel along the aligned splines in a common direction defined by the aligned splines. For example, spline 245 of gear 240 adjacent to spine 235 of gear 230 and adjacent to another spline of gear 250 is enabled, permitted, and otherwise configured to travel along the aligned splines of gears 230,250 in a common direction defined by the aligned splines of gears 230,250.

When the locking gear 240 travels along axis A away from receiving gear 230, the splines of these gears 230,240 may be disengaged, allowing component 110 to rotate relative to component 120. This direction along axis A may correspond to a perpendicular direction into a plane of FIG. 2. The locking gear 240 may travel in this direction by selectively applying an external force to the gear 240 along axis A in this inward direction. In this configuration, wherein gears 230 and 240 are not engaged, system 200 is configured to be placed in other positions, including a second position as illustrated in FIG. 3.

A second position for system 200 is shown in FIG. 3. The second position is different from the position shown in FIG. 2. The opening angle of the second position is greater than zero degrees. For example, the opening angle of FIG. 3 is twenty-two and a half degrees, as spline 245 has traveled an interval angle and a half relative to its prior position adjacent spline 235 and an interval angle for gear 240 is fifteen degrees. Mounting surfaces of components 110,120 are not parallel in the second position of system 200 as shown. The locking gear 240 is also in a different configuration in the second position. The locking gear 240 is in an unlocked configuration in the second position. The locking gear 240 is engaged with receiving gear 230 in the first position, but not engaged with receiving gear 230 in the second position.

In FIG. 3, locking gear 240 remains engaged with second receiving gear 250. However, due to the relative rotation and different opening angle between components 110 and 120, the receiving gears 230 and 250 are no longer aligned, such that splines of second receiving gear 250 are not positioned along a same angle about a central axis as splines of receiving gear 230. The splines of locking gear 240 are disposed at one or more first angles in the first position of FIG. 2, but one or more different, second angles in the second position in FIG. 3 relative to the splines of receiving gear 230. The splines of second receiving gear 250, such as spline 255, are shown in FIG. 3 between the splines of receiving gear 230. The splines of receiving gear 250 are also disposed at different relative angles about axis A relative to the splines of receiving gear 230. The splines of the locking gear 240, such as spline 245, are prevented from traveling into receiving gear 230 and engaging with the splines of this gear 230 such as spline 235. As such, the receiving gear 230 and component 110 may rotate relative to receiving gear 250 and component 120, as receiving gear 250 is engaged with locking gear 240 but receiving gear 230 is not engaged with locking gear 240. Each gear may be cylindrical with axis A being a center axis about which each gear rotates during movement of the hinge. In embodiments, gears of a locking hinge device may each partially or fully circumscribe a common central axis, such as axis A.

In embodiments, regular surfaces of gears of a locking hinge device may be provided at regular, repeating intervals. Each interval may be associated with an interval between opening angles and positions of a system in which the gears may be selectively engaged and a locking hinge device may be locked. Gears may be selectively engaged in accordance with a relative angle at which a locking gear may be physically received by a receiving gear of a locking hinge device. Gears may also be selectively engaged in accordance with application of a force, such as a biasing force, to cause a locking gear to travel into and/or be received by a receiving gear. Gears may also be selectively engaged in accordance with application of another force, such as an external force, to prevent a locking gear from traveling into a receiving gear and/or remove a locking gear from a receiving gear.

In the example embodiment of FIG. 2 and FIG. 3, the splines of the gears 230, 240, and 250 are provided at regular, repeating intervals. In FIG. 3, the component 120 is rotated relative to component 110 by half an interval relative to the angular intervals between splines of gears such as locking gear 240. However, other relative orientations may also prevent locking gear 240 from engaging with outer receiving gear 230, including those between ⅕ of an interval and ⅘ of an interval, depending on the shapes and angular widths of the splines. The splines in FIGS. 2 and 3 are provided at fifteen-degree intervals, though other intervals may also be employed in embodiments according to various aspects of the present disclosure, including intervals of eight, sixteen, twenty-four, thirty-two, and forty degrees. Greater and lesser intervals may also be employed.

As shown, the rotational steps or fidelity of the splines is fifteen degrees using a locking gear with a full set of twenty-four splines. The splines of locking gear 240 and the splines of receiving gear 230 are configured to be engaged at one or more first angles about an axis, while not configured to be engaged at one or more other, second angles about the axis.

FIG. 2 and FIG. 3 also show splines positioned at an entire circumference of locking gear 240 and the corresponding inner circumferences of each of the receiving gears 230, 250. However, such splines may alternately be positioned at a subset or subsets of the circumference, such as between 0-90 degrees and/or 180-270 degrees about a central axis. Other numbers of subsets and angular spans of subsets of a circumference about a central axis may also be employed according to various aspects of the present disclosure. It will be appreciated that these angles and ranges are merely non-limiting examples.

Figure 4:
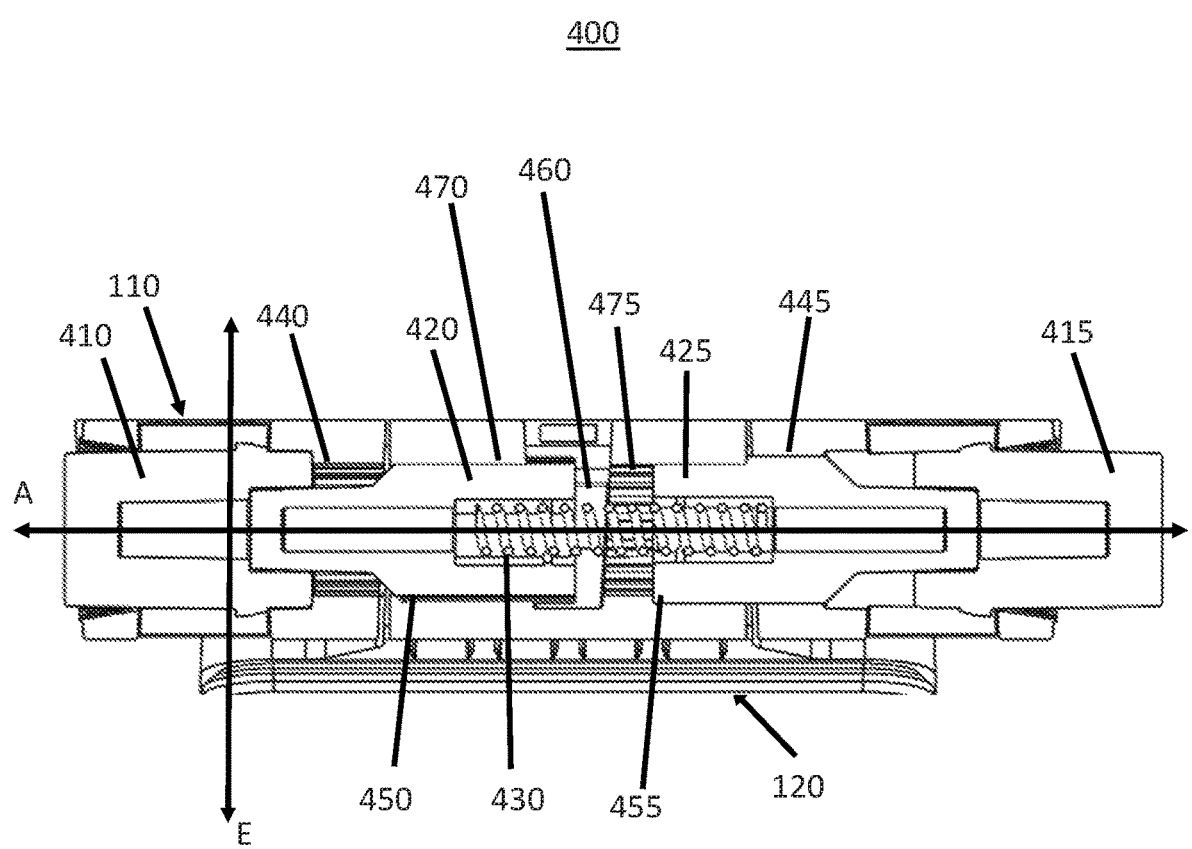
FIG. 4 is a cross-sectional view of an example locking hinge device at an opening angle and a locked configuration according to various aspects of the present disclosure.
Figure 5:
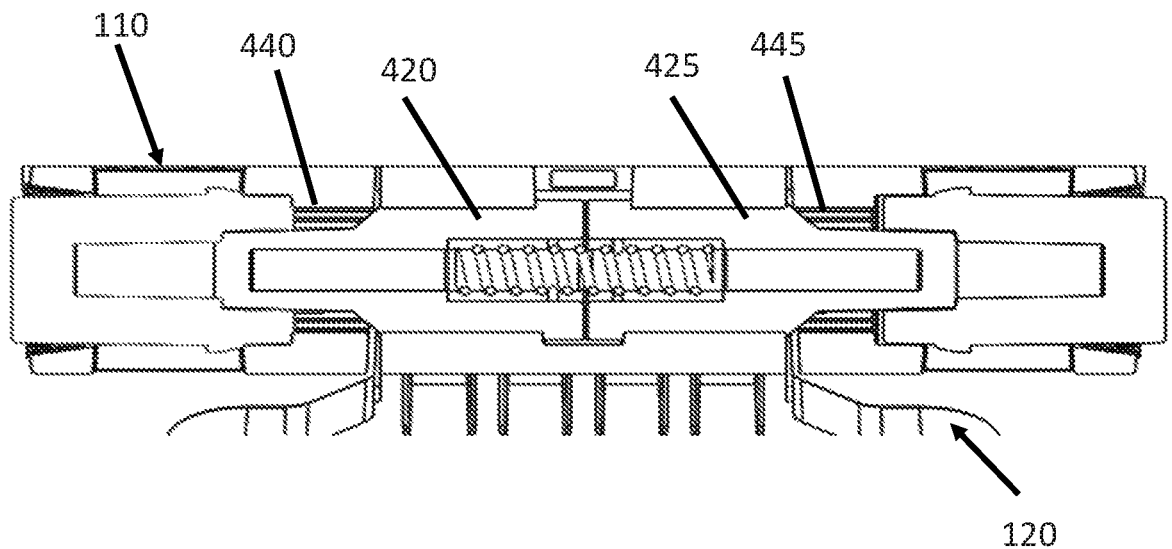
FIG. 5 is a cross-sectional view of an example locking hinge device at another opening angle and an unlocked configuration according to various aspects of the present disclosure.
Figure 6:
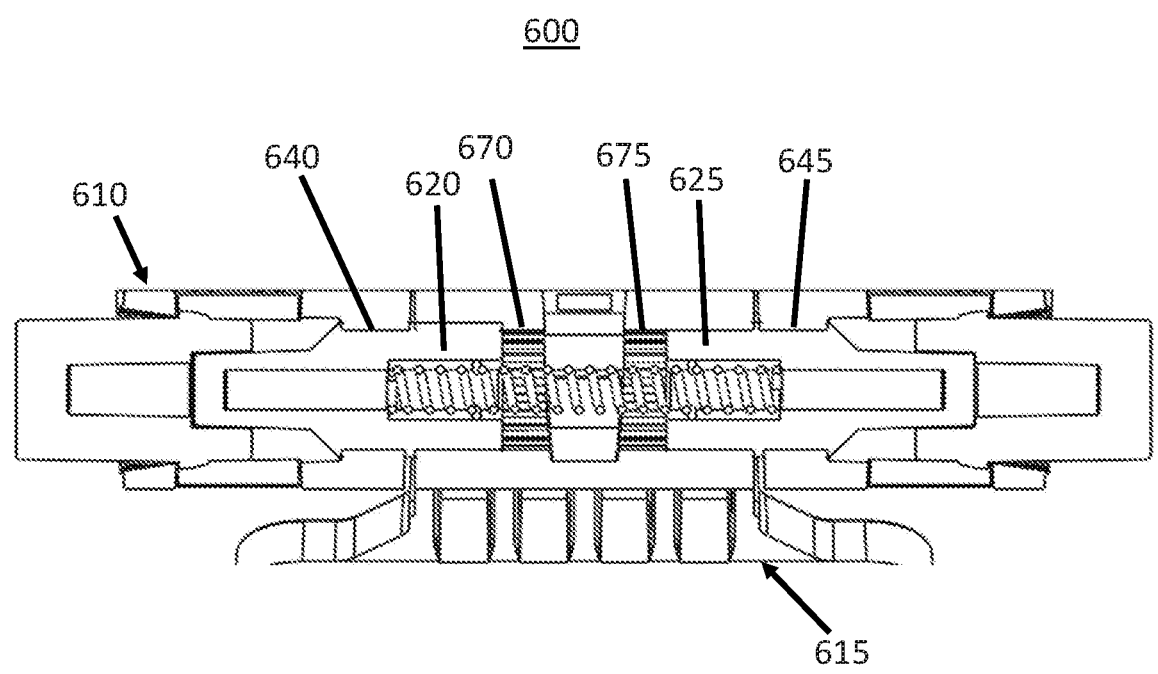
FIG. 6 is a cross-sectional view of an example locking hinge device at an opening angle and a locked configuration according to various aspects of the present disclosure.

Cross-sectional views of example hinges according to various aspects of the present disclosure are shown in FIG. 4-6. FIG. 4 shows a cross-sectional view of a hinge 400 in which a first locking hinge device is disposed in an unlocked configuration and a second locking hinge device is disposed in a locked configuration. FIG. 5 shows a cross-sectional view of the hinge 400 in which a first locking hinge device is disposed in an unlocked configuration and a second locking hinge device is disposed in an unlocked configuration. FIG. 6 shows a cross-sectional view of a hinge 600 in which a first locking hinge device is disposed in a locked configuration and a second locking hinge device is disposed in a locked configuration.

In FIG. 4, hinge 400 enables components 110 and 120 to pivot about central axis A. Hinge 400 includes a first locking hinge device and a second locking hinge device. The first locking hinge device includes a locking gear 420 and a receiving gear 440. The first locking hinge device also includes a hinge tab 410 and a biasing device 430. The receiving gear 440 is an outer receiving gear and the first locking hinge device also includes an inner receiving gear 470. The second locking hinge device includes a locking gear 425 and a receiving gear 445. The second locking hinge device also includes a second hinge tab 415 and a biasing device 430. The same biasing device 430 is included in each locking hinge device. The receiving gear 445 is also an outer receiving gear for the second locking hinge device and the second locking hinge device also includes an inner receiving gear 475 shown in FIG. 4. As shown in FIG. 4, each of the elements of the locking hinge devices are fully contained within hinge 400, thereby maintaining a low profile for the hinge 400. Despite its compact size, hinge 400 still enables components 110,120 to be disposed at different positions.

The hinge 400 includes a central region 460. In the example of FIG. 4, a median or midpoint of axis A is located within this central region 460. The central region 460 may include a portion of an opening of a barrel portion of a component of a system in which hinge 400 is included. The central region 460 is shown as hollow in FIG. 4, though other sizes and manners of fill may be employed in embodiments. The central region 460 is defined along axis A between inner receiving gears 470,475 of each of the first locking hinge device and the second locking hinge device. In embodiments, an end of a locking gear 420 of a first locking hinge device may abut an end of a locking gear 425 of a second locking hinge device. Ends of these locking gears 420, 425 may be disposed immediately adjacent each other or abut upon each locking gear 420,425 being disposed in an unlocked configuration. In other embodiments, the locking gears or other elements of each locking hinge device may not be adjacent to each other, increasing a length of a central region along a central axis.

In embodiments, a locking hinge device includes a hinge tab. A hinge tab 410 of the first locking hinge device is provided along axis A at a distal location relative to central region 460. Hinge tab 410 is cylindrical in shape with a rectangular cross-section, though other shapes may be employed in embodiments according to various aspects of the present disclosure. A first end of the tab 410 is exposed externally from the hinge 400 and the first locking hinge device. This first end may be physically actuated along axis A toward region 460. An external force may be applied to the first end and transferred through the hinge tab 410 along axis A. A second end of tab 410 is provided opposite the first end along axis A. This end is configured to physically contact locking gear 420 as shown in FIG. 4. This contact may be separable, such that tab 410 may contact gear 420 when actuated along axis A toward the gear 420, but motion of the tab 410 away from gear 420 along axis A may not pull locking gear 420 along axis A as well. In other embodiments, the hinge tab 410 and locking gear 420 may be securely coupled, such as through press fitting an end of the locking gear 420 into the hinge tab 410. An external force received via the first end of hinge tab 410 may be transferred to the locking gear 420 via the second end of the hinge tab 410. The second end of tab 410 may partially receive a first end of gear 420 as shown in FIG. 4, though other configurations are possible. In embodiments, a separate and non-integral hinge tab 410 and locking gear 420 may enable these elements of the first locking hinge device to be placed and retained in barrel portions of components 110 and 120.

Hinge tab 410 may further include one or more raised stops to retain the tab 410 within a barrel portion of a component. The stop or stops may protrude from a side surface of the tab 410 into a defined cutout region of the barrel portion, thereby defining a constrained range along which tab 410 may travel along axis A away from region 460. At a first end of the range, associated with a locked configuration, a hinge tab may extend along a central axis further than an edge of components associated with the hinge tab. Such an arrangement may enable the hinge tab to be accessed and actuated by a user to change positions of the hinge and system. At a second end of the range, associated with an unlocked configuration, the hinge tab may extend along a central axis to substantially a same distance as an edge of one or more components in a system including the hinge tab. In the unlocked position, the hinge tab may be flush with one of the components of the system, providing tactile and visual confirmation that the hinge tab and associated gear have been fully actuated and placed in an unlocked configuration.

The second locking hinge device of hinge 400 includes a second hinge tab 415. The second tab 415 of the second locking hinge device is also provided along axis A at a distal location relative to central region 460. Hinge tab 415 is cylindrical in shape with a rectangular cross-section, though other shapes may be employed in embodiments according to various aspects of the present disclosure. A first end of the hinge tab 415 is exposed externally from the hinge 400 and the second locking hinge device. This first end may be physically actuated along axis A toward region 460. An external force may be applied to the first end and transferred through the hinge tab 410 along axis A in a first direction, opposite a direction in which an external force may be applied to hinge tab 410.

A second end of tab 415 is provided opposite the first end of hinge tab 415 along axis A. This end is configured to physically contact locking gear 425 as shown in FIG. 4. This contact may be separable, such that tab 415 may contact gear 425 when actuated along axis A toward the gear 425, but motion of the tab 415 away from gear 425 along axis A may not pull gear 425 along axis A as well. An external force received via the first end of hinge tab 415 may be transferred to the locking gear 425 via the second end of the hinge tab 415. The second end of tab 415 may partially receive a first end of gear 425 as shown in FIG. 4, though other configurations are possible. In embodiments, non-integrated hinge tab 415 and locking gear 425 may enable these elements of the second locking hinge device to be placed and retained in barrel portions of components 110 and 120.

Hinge tab 415 may further include one or more raised stops to retain the tab 415 within a barrel portion of a component. The stop or stops may protrude from a side surface of the tab 415 into a defined cutout region of the barrel portion, thereby defining a constrained range along which tab 415 may travel along axis A away from central region 460. In FIG. 4, hinge tab 415 extends beyond an edge of component 110, enabling the tab 415 to be accessed and actuated, while the hinge tab 410 of the first locking hinge device is disposed flush with an edge of the same component 110, indicating that the first locking hinge device is disposed in an unlocked configuration and cannot be further actuated. Other relative dispositions between a hinge tab and component may also be used in other configurations according to various aspects of the present disclosure. In embodiments, external forces may be applied to hinge tabs 410,415 at a same time. Such forces may place the locking hinge devices in respective unlocked configurations, whereby interconnected components may be rotated relative to each other from a first position to one or more second positions. In embodiments, hinge tabs such as tabs 410 and 415 also couple the locking gears to one or more outer barrel portions of a component, enabling the barrel portions to be rotated about a central axis while the locking gears themselves are not directly coupled to the one or more outer barrel portions. The hinge tabs may ensure that the one or more outer barrel portions remain coupled to the hinge when the hinge is disposed in an unlocked configuration. Accordingly, a hinge tab may provide both rotational support for a component about a central axis as well as compression force along the axis.

A first locking hinge device in hinge 400 includes locking gear 420. The locking gear 420 is cylindrical in shape and has one or more rectangular cross-sections as shown in FIG. 4. The gear 420 has at least two portions including a first portion without splines and a second portion with splines 450. The first portion may have a smooth surface on a side proximate outer receiving gear 440. As shown in FIG. 4, the first portion without splines may be positioned adjacent tab 410 along axis A, while the second portion with splines 450 may be positioned closer to region 460 along axis A. Including splines 450, a diameter of the second portion is larger than a diameter of the first portion. The first portion has a first length along axis A and the second portion has a second length along axis A. The first length may be equal, greater, or less than the second length. The length of the second portion of gear 420 is greater than the length of the first portion of gear 420, interconnected by an angled, funnel shaped portion of gear 420 as shown in FIG. 4. The splines 450 extend along an outer surface of the second portion, parallel to axis A. The splines 450 are integrally formed on the surface of gear 420.

A second locking hinge device in hinge 400 includes locking gear 425. The locking gear 425 is cylindrical in shape and has one or more rectangular cross-sections as shown in FIG. 4. Locking gear 425 has at least two portions including a first portion without splines and a second portion with splines 455. The first portion has a smooth surface on a side proximate hinge tab 415 and outer receiving gear 445. As shown in FIG. 4, the first portion without splines is positioned adjacent tab 415 along axis A, while the second portion with splines 455 is positioned closer to region 460 along axis A. Including splines 455, a diameter of the second portion is larger than a diameter of the first portion. The first portion has a first length along axis A and the second portion has a second length along axis A. The first length may be equal, greater, or less than the second length. The length of the second portion of gear 425 is greater than the length of the first portion of gear 425, interconnected by an angled, funnel shaped portion of gear 425 as shown in FIG. 4. The splines 455 extend along an outer surface of the second portion, parallel to axis A. The splines 455 are integrally formed on the surface of gear 425.

Locking gear 420 may be biased toward or against tab 410 by a biasing device 430. As shown in FIG. 4, the biasing device may include a spring. In an unlocked configuration, the spring may be compressed by an external force applied via tab 410. In a locked configuration, the spring may extend relative to the unlocked configuration and apply an internal force to locking gear 420 along axis A.

One, same spring is shown in FIG. 4 for both locking hinge devices, wherein the biasing device 430 provides an internal or biasing force to each locking gear 420, 425. In the example embodiment of FIG. 4, biasing device 430 actuates each of locking gears 420 and 425 in opposite directions along axis A. In other embodiments according to various aspects of the present disclosure, one or more springs may be used, including separate springs or other biasing devices for each locking hinge device. Alternate biasing devices may include compressible materials or fillers, such as resilient foams and/or other materials.

A biasing device may also be partially received in one or more locking gears. For example, biasing device 430 is at least partially received with a cavity in locking gear 420. A biasing device may remain aligned along a central hinge at least in part by being received by one or more locking gears of a hinge. A cavity in a locking gear to receive a biasing device such as device 430 may also decrease a combined length of a biasing device and locking gear, making the locking hinge device more compact along a central axis and/or permit a greater length of a locking gear to be received in a same barrel portion in which the biasing device is disposed. In embodiments, biasing device 430 is at least partially received in a second locking gear 425 as well.

A locking gear may selectively engage a receiving gear of a locking hinge device. For example, locking gear 420 selectively engages an outer receiving gear 440. Locking gear 425 selectively engages outer receiving gear 445 in a second locking hinge device. Receiving gear 440 is physically integrated in component 110 in FIG. 4. Receiving gear 445 is physically integrated in component 110 in FIG. 4. Each receiving gear 440,445 is thus rotationally secured or coupled with component 110. Each receiving gear 440, 445 is integrally formed on an inner surface of a different barrel portion of component 110. Receiving gear 440 is positioned away from region 460 along a central axis A of the hinge 400 and further away from a midpoint of the axis A than a region at which component 120 surrounds gear 420 and axis A. Receiving gear 445 is positioned away from region 460 in an opposite direction from receiving gear 440 along a central axis A of the hinge 400. Receiving gear 445 is also further away from a midpoint of the axis A than a region at which component 120 surrounds gear 425 and axis A. Each receiving gear 440,445 includes a plurality of splines integrated along an inner surface of an opening of a respective barrel portion of component 110. Such splines of an individual locking gear 440 or 445 may be elongated in a direction parallel to axis A. The shape of these splines is complementary to the respective splines 450 of gear 420 and splines 455 of gear 425, such that each set of locking gear and receiving gear splines may be securely engaged with each other in a non-rotatable manner.

In embodiments, a locking gear may also engage a second, inner receiving gear. For example, the splines 455 of gear 425 also engage an inner receiving gear 475 shown in FIG. 4. In embodiments, the splines 455 do not disengage gear 475, even during rotation of coupled mount components 110,120 between positions. The splines 455 and gear 425 are rotationally secured or coupled to component 120 by way of inner receiving gear 475. The inner surface of gear 475 is oriented toward axis A. The splines of the inner receiving gear 475 are parallel to axis A. The inner receiving gear 475 is physically integrated with component 120. The inner gear 475 is fixed and non-moveable relative to component 120. The splines of inner gear 475 are integrally formed on an inner surface of component 120. The splines of inner gear 475 are integrally formed on an inner surface of an opening of a barrel portion of component 120. As such, inner gear 475 and outer gear 445 are mounted on physically separate components, such that a relative angle of the splines of these gears 445, 475 may be adjusted by rotation of a first component relative to a second component. The inner female gear 475 also includes a length along axis A, which may be equal, greater, or less than a length of a second portion of locking gear 425. In hinge 400, the length of inner receiving gear 475 is less than a length of the second portion of the locking gear 425. Inner gear 475 has a same diameter as outer receiving gear 445, enabling close engagement with outer receiving gear 445. Hinge 400 also includes an inner receiving gear 470 associated with the first locking hinge device and locking gear 420, which is symmetrical to inner locking gear 475 in the barrel portion of component 120 and configured to engage locking gear 420.

Each of the gears 425, 445, and 475 are shown as cylindrical in shape about axis A, though other shapes are possible. In embodiments, other shapes may include those that are symmetrical. For example, each gear may have a multi-sided, regular polygon shape. In such embodiments, rotational coupling may be provided between locking and receiving gears by engagement of complementary outer and inner surfaces of such gears, such that splines or other projections on each surface of the regular polygon shaped gears may not be necessary. For example, a locking gear may include a regular, fifteen-sided polygon with planar side surfaces, wherein each side surface may engage a corresponding surface of a complementarily-shaped receiving gear. Various shapes about a central axis may be employed by gears according to various aspects of the present disclosure, including those that are symmetrical about a radius from the central axis and/or have surfaces with same shapes that repeat at an interval about the central axis.

Splines of gears may also be complementary in shape. For example, the splines of gears 425, 445, and 475 are also complementary in shape, such that rotational motion is prevented when the locking gear 425 is engaged with inner gear 475 or selectively engaged with outer gear 445.

In embodiments, a position of gears may be changed and/or reversed compared to that illustrated in FIG. 4. For example, a locking hinge device may be reversed along an axis such that a receiving gear may travel along the axis between a locked and unlocked configuration. In these embodiments, an external force and internal force may be applied to the selectively engageable receiving gear, rather than a locking gear. Each component of a hinge in these embodiments may include integrated locking gears, rather than receiving gears. Locking hinge devices with combinations of different selectively engageable gears may also be provided according to various aspects of the present disclosure, including a system with a first locking hinge device with a locking gear that travels along an axis and a second locking hinge device that includes a receiving gear that travels along the same axis.

When multiple locking hinge devices are provided, an opening angle of the system may be secured by engaging each of the locking hinge devices. The multiple locking hinge devices may be engaged at a same time to secure (e.g., lock) the system at a selected locking angle. In these embodiments, gears in each of the multiple locking hinge devices may be aligned when the system is disposed in a locking configuration with the opening angle. For example, a locking gear and an outer gear for each of multiple locking hinge devices may be respectively aligned when the hinge and system are disposed at the opening angle. A first locking gear may be aligned with a first receiving gear in a first locking hinge device at a same time a second locking gear may be aligned with a second receiving gear in a second locking hinge device. Pairs of gears between the first locking hinge device and second locking hinge device may or may not be aligned in these embodiments.

In embodiments, gears of multiple locking hinge devices may also be aligned between different locking hinge devices according to various aspects of the present disclosure. For example, receiving gears and locking gears may be aligned between multiple locking hinge devices when the hinge and system are disposed at the opening angle. A first locking gear may be aligned with a first receiving gear in a first locking hinge device and a second locking gear of a second locking hinge device at a same time when both locking hinge devices are configured to be selectively engaged. A first receiving gear may be aligned with a second receiving gear in a first locking hinge device, a first receiving gear in a second locking hinge device, and a second receiving gear in a second locking hinge device at a same time when both locking hinge devices are configured to be selectively engaged. As discussed elsewhere herein, aligned receiving gears may have one or more splines disposed at one or more common first angles about an axis. An aligned receiving gear and locking gear may have one or more splines disposed at two different angles, such that the locking gear may travel into and be received by the receiving gear.

In other embodiments according to various aspects of the present disclosure, an opening angle of a system may be locked or secured by engaging only one locking hinge device among multiple locking hinge devices. One or more other locking hinge devices may be unlocked, yet the overall system may be securely positioned at a given angle because at least one locking gear is engaged with one respective receiving gear of the one locking hinge device. In these embodiments, gears of at least one of the multiple locking hinge devices may not be aligned when the system is disposed in a locking configuration with the opening angle. For example, a locking gear and a receiving gear of a first locking hinge device of the multiple locking hinge devices may not be aligned when the hinge and system are disposed at the opening angle, such that only a second locking hinge device with aligned gears may be selectively engaged to lock the hinge and system at an associated opening angle. In these embodiments, gears integrated with a same first component may not be aligned, while gears of a second component may be aligned, such that only one pair of gears between components may be aligned for different positions and opening angles of a hinge and system. First and second splines of gears of a first locking hinge device may be configured to be engaged at one or more first angles about the axis while third and fourth splines of another locking hinge device may be configured to be engaged at one or more second angles about the axis, wherein the first angles are different from the second angles.

In embodiments, the use of multiple locking hinge devices may allow smaller intervals of locked opening angles to be provided, relative to the intervals provided in the splines on the gears alone. Smaller intervals may be allowed when different locking hinge devices are configured to be selectively engaged at different positions of a system in which the different locking hinge devices are included. For example, if each of the gears of the locking hinge devices are configured with twenty-four-degree spline intervals, the collective system may be locked at half intervals, such as twelve degrees, using different locking hinge device for the half interval and a full interval. Smaller intervals of opening angles may be enabled by providing respective receiving gears of each hinge device at different angular orientations about a central axis. For example, an angular position of a first spline on a first outer receiving gear may be disposed at a different angle relative to a second spline on a second outer receiving gear. Splines of gears integrated with a same component of a system may be offset from each other. For example, a twelve-degree incremental angle change may be accomplished using two twenty-four-degree teeth spaced gears while offsetting corresponding outer receiving gear splines in outer barrel portions of a component by twelve degrees. Alternately, inner receiving gears for two locking hinge devices may be offset about an axis within a same component. In both of these examples, the other pairs of receiving gears between each locking hinge device may be aligned, such that the two locking hinge devices may include a pair of aligned receiving gears and a pair of offset receiving gear gears. Both of these examples may allow one of the two locking gears to engage at every twelve degrees of angle, corresponding to a half interval angle respective gears in the locking hinge devices. Offset receiving gears may engage a respective locking gear at alternating intervals of opening angles.

In FIG. 4, the splines of outer receiving gear 440 are not angularly aligned with the splines of outer receiving gear 445. The splines of gear 440 are offset at an angle about axis A relative to the angular positions of the splines of gear 445 about axis A. In such an arrangement, the splines of an inner receiving gear 470 of the first locking hinge device and the inner receiving gear 475 may be angularly aligned. One or more splines of the inner receiving gears 470,475 may be located at one or more same rotational positions about a center axis and parallel to each other along the center axis. The collective alignment of gears enables an internal force from biasing device 430 to cause locking gear 425 to engage outer receiving gear 445, but prevents an internal force from causing locking gear 420 to travel into and be engaged with outer receiving gear 440 as shown in FIG. 4. Accordingly, for outer receiving gears with respectively offset splines, aligned splines of locking gears of different locking hinge devices may each engage a corresponding receiving gear at a different rotational angle about a central axis, thereby enabling a system to be locked at different opening angles.

In FIG. 4, tabs 410,415 have been released and are receiving no external force applied thereto. As such, biasing element 430 pushes the locking gears 420,425 toward the tabs 410,415 along axis A. However, with this opening angle or relative rotation between components 110 and 120, only receiving gears 475 and 445 are aligned, permitting only gear 425 to engage with gear 445. This secures the component 110 to component 120 at a fixed opening angle, even though gear 420 is not engaged with gear 440. Component 110 and component 120 are locked and not configured to rotate relative to each other about a central axis. The example opening angle in FIG. 4 is twenty-two and a half degrees, as the first and second locking hinge devices have gears with fifteen-degree interval angles, though a gear of the first locking hinge device is offset from a gear of the second locking hinge device by half an interval angle. Such angles and the opening angle are merely examples and embodiments according to various aspects of the present disclosure may employ other interval angles and offset angles as well.

In alternate embodiments according to various aspects of the present disclosure, the splines of inner receiving gears of a pair of locking hinge devices may be offset in an angular manner, while the splines of outer receiving gears of the locking hinge devices may be aligned. The offset gears, comprising either inner receiving gears or outer receiving gears of two locking hinge devices may be mounted to a common component, such as component 110 or component 120, so as to permit a common angular motion or rotation to be applied to both gears at the same time. In these embodiments, gears on one component may be aligned, while gears on another component may be offset, enabling the gears of different locking hinge devices to be locked at different angles.

In embodiments according to various aspects of the present disclosure, multiple locking hinge devices may be disposed in an unlocked configuration at a same time, permitting a relative position and opening angle between two components interconnected by the hinge to be adjusted. For example, in FIG. 5, each of the first and second locking hinge devices of hinge 400 have been disposed in a respective unlocked configuration. Locking gear 420 is not engaged with outer receiving gear 440 and locking gear 425 is not engaged with outer receiving gear 445. A second portion of locking gear 420 and a second portion of locking gear 425 are each fully received within the second component 120, enabling the components 110,120 to be rotated relative to each other without being prevented by either locking gear 420,425. A distance between opposite ends of each locking gear is less than a first distance associated with a distance between opposite ends of a barrel portion in which inner receiving gears for the locking gears are disposed. Both locking gears 420, 425 remain engaged with respective inner receiving gears of the first and second locking hinge devices. Proximate ends of the locking gears 420, 425 also abut each other at a midpoint of axis A in the hinge 400 in this configuration. Both locking gears 420 and 425 are pushed or pressed toward a central region of the hinge 400, such that their splines are not engaged with respective outer receiving gears 440,445. This allows the overall system 200 to be unlocked and components 110,120 to be able to be freely rotated relative to each other about axis A. The movement of gears 420,425 may be controlled by physical forces applied to tabs 410,415 in opposite directions toward a central region of the hinge along axis A. The first portions of locking gears 420, 425 and respectively coupled hinge tabs serve as pins in the hinge formed by the locking hinge devices, allowing separate adjacent barrel portions of components 110,120 to be rotated in common about axis A.

In embodiments according to various aspects of the present invention, multiple pairs of gears between multiple locking hinge devices may be aligned, such that each of the locking hinge devices may be engaged at a same time. FIG. 6 illustrates a cross-sectional view of an example hinge according to various aspects of the present disclosure. Hinge 600 interconnects component 610 with component 615. Hinge 600 includes two locking hinge devices. A first locking hinge device of the two locking hinge devices includes locking gear 620, an outer receiving gear 640, and an inner receiving gear 670. A second locking hinge device of the two locking hinge devices includes locking gear 625, an outer receiving gear 645, and an inner receiving gear 675. In this example, the outer gears 640, 645 are aligned and integrated with a same component 610. The inner gears 670,675 are also aligned and integrated with a same component 615. The collective alignment enables locking gear 620 to engage outer receiving gear 640 at a same opening angle between components 610,615 at which locking gear 625 is enabled to engage outer receiving gear 645. A biasing force provided to each locking gear 620,625 may cause each locking gear 620,625 to travel along an axis to engage a respective receiving gear 640,645. In such an arrangement, intervals at which components 610,615 may be locked may be determined in accordance with an interval angle between splines of locking gears 620,625, rather than half angles or other partial interval angles between such splines. Such an arrangement may increase a strength at which the components 610,615 may be secured at an opening angle, as both or all locking hinge devices may be engaged at a same time, rather than a single or subset of available locking hinge devices in a hinge.

Figure 7:
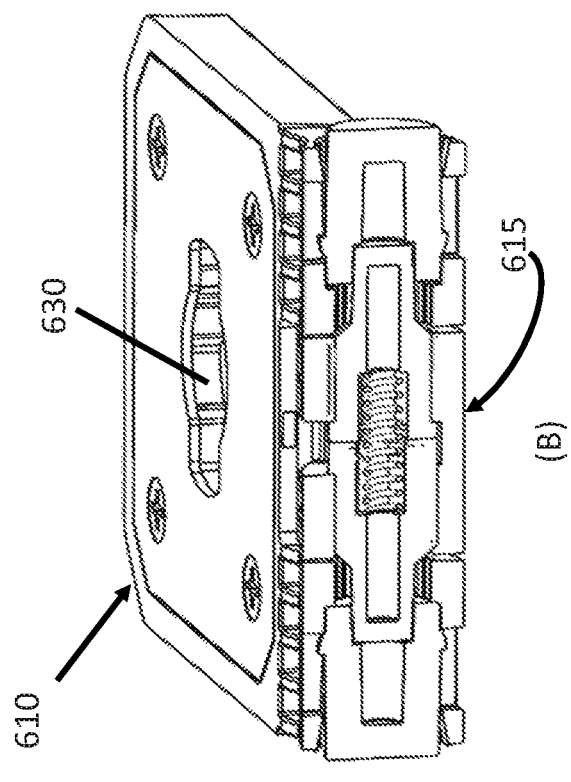
FIG. 7 is a perspective view of an example locking hinge device and system in different configurations at an opening angle according to various aspects of the present disclosure.
Figure 7:
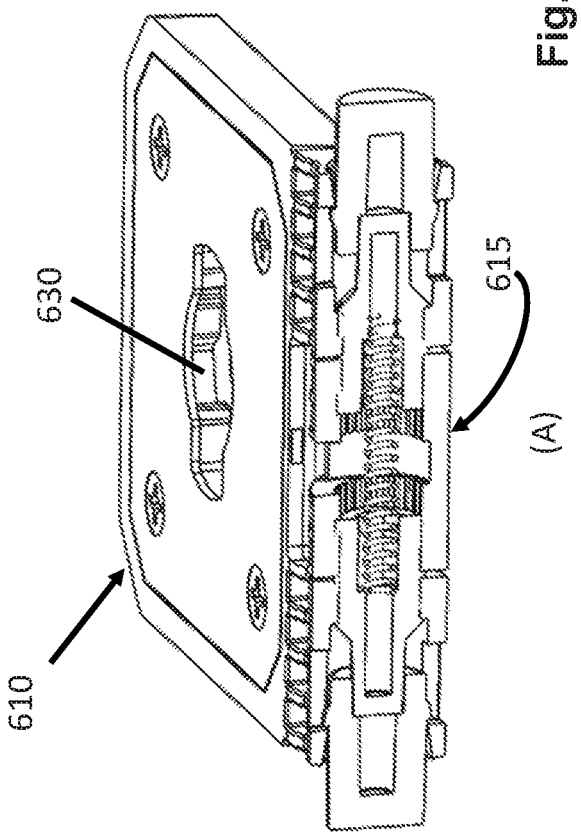
Figure 8:
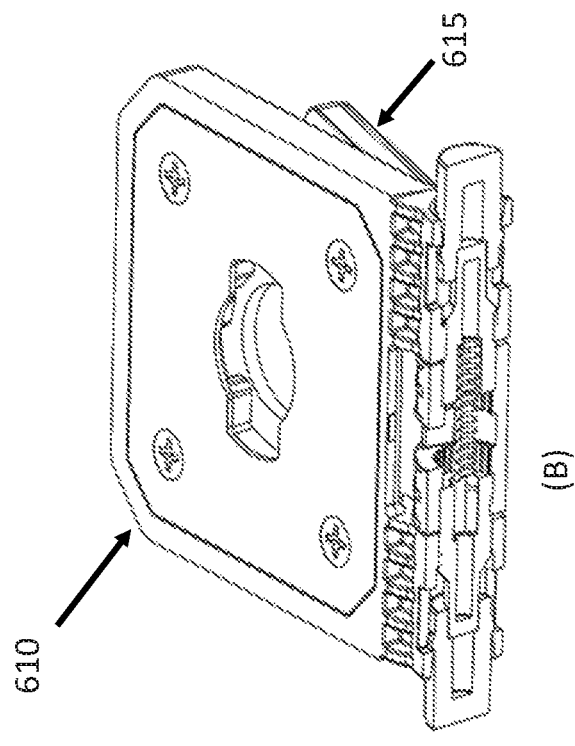
FIG. 8 is a perspective view of an example locking hinge device and system in different configurations at another opening angle.
Figure 8:
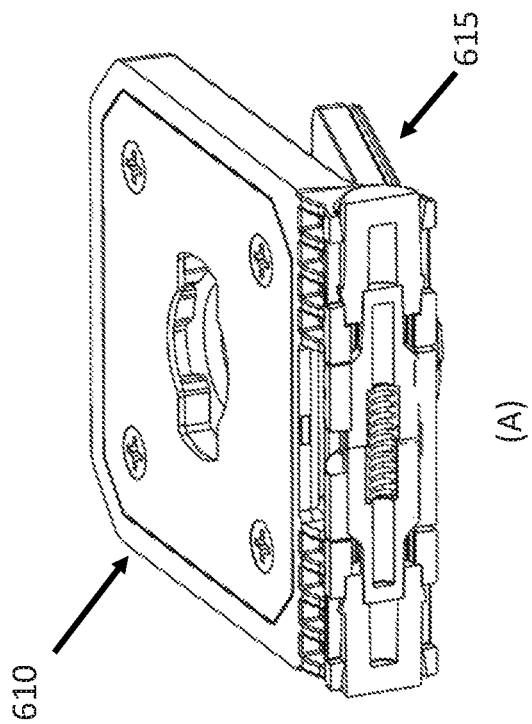
Figure 9:
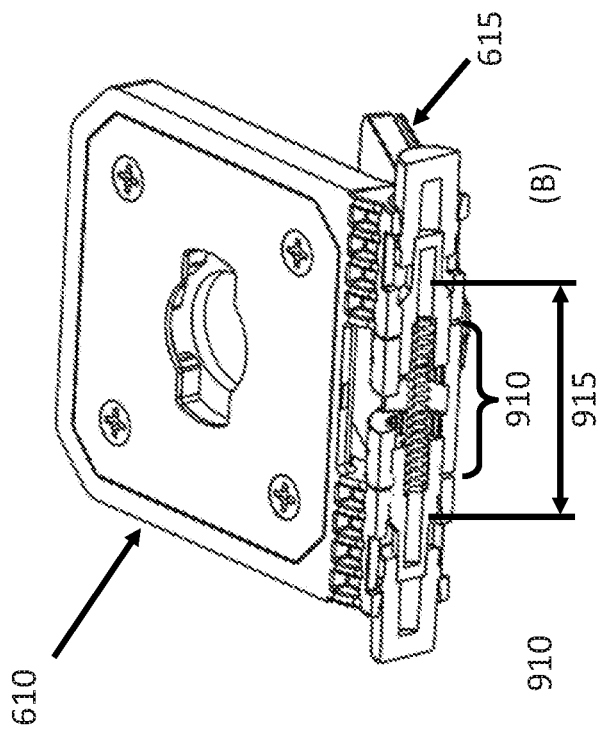
FIG. 9 is a perspective view of an example locking hinge device and system in different configurations at another opening angle according to various aspects of the present disclosure.
Figure 9:
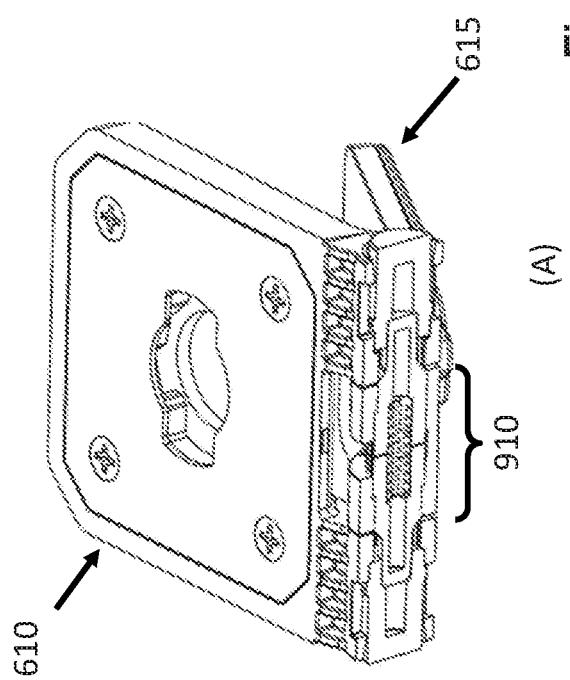

Various perspective views of an example locking hinge device and system in different configurations at different positions are shown in FIG. 7-9. Two configurations for each position of the system are illustrated, including a first configuration in which a system is locked at a given position and a second configuration in which a system is unlocked at the same given position for the system. In each figure, the system is shown locked and unlocked at a common opening angle. In each figure, a cross section of a hinge is shown to aid in understanding of configuration of elements within the hinge, including their relative positions. In embodiments according to various aspects of the present disclosure, the elements within a hinge may be at least partially enclosed within one or more barrel portions of components of the system.

In embodiments, transitioning between the two configurations may involve an external force applied to each of the locking hinge devices. Transitioning from a locked configuration may include application of an external force to the hinge tabs. An external force may be applied to a tab of the left locking hinge. An external force may also be applied to a tab of the right locking hinge. The external forces may each be applied toward a midpoint of the central axis. The external forces may be applied in an inward direction for the system along each locking hinge device. The external forces may be applied at a same time. Transitioning to a locked configuration may include ending application of this external force along the central axis. When the external force is no longer applied, the locking hinge devices may lock, securing the system in a position with a selected opening angle. The locking hinge devices may lock automatically at a position in accordance with an internal force applied by a biasing device, as well as alignment between pairs of gears coupled or integrated with different components of the system. In embodiments according to various aspects of the present disclosure, a same system comprising a hinge may repeatedly transition between different positions by applying one or more external forces to the hinge, adjusting a relative rotation between two components of the system to establish an adjusted opening angle between the components, and removing one or more external forces.

In FIG. 7, the left drawing (A) shows the system locked with a zero-degree opening angle between components 610 and 615. In this first configuration, the locking gear in the right locking hinge device is engaged with an outer receiving gear, while the locking gear in the left locking hinge device is also engaged with its outer receiving gear. The locking gears are each engaged with a respective inner receiving gear of the left and right locking hinge devices. The biasing device in this drawing forces each of the locking gears away from a center position and both locking gears are enabled (e.g., are configured to) travel into its respective outer receiving gear. The biasing device provides internal force to press the left locking gear toward its outer receiving gear, causing the second portion of the locking gear in the first locking hinge device to enter and engage the left outer receiving gear because splines of the two gears are aligned at this opening angle. The biasing device provides an internal force to press the right locking gear toward its outer receiving gear, causing the second portion of the locking gear in the second locking hinge device to enter and engage the right outer receiving gear because splines of the two gears are also aligned. In this embodiment, a same biasing device provides an inner force to each locking gear in two different locking hinge devices in opposite directions along an axis. The locking gear of the first locking hinge device concurrently engages receiving gears in both components 610 and 615, locking the components 610,615 at the zero-degree opening angle. The locking gear of the second locking hinge device also concurrently engages receiving gears in both components 610 and 615, locking the components 610,615 at the zero-degree opening angle.

In FIG. 7, the right drawing (B) shows the system unlocked with a zero-degree opening between components 610 and 615. Since the device is unlocked, relative rotation between components 610 and 615 is not mechanically restricted, even though the zero-degree orientation or position between these components 610, 615 has not been adjusted. In the second configuration on the right side of FIG. 7, the locking gear in neither locking hinge device is engaged with a respective outer receiving gear. First portions of each locking gear are coupled to a component in which the outer receiving gears are integrated, but this coupling does not prevent rotation of either locking hinge device. A smaller diameter of the first portion of the locking gear allows the locking gear to be enclosed by the outer receiving gears in each locking hinge device, but not be in contact or otherwise engaged with the respective outer receiving gears. Both locking gears are engaged with both inner receiving gears of the respective left and right locking hinge devices. In the unlocked configuration, a mechanical force is applied to the right tab of the second locking hinge device from an external, inward direction toward the hinge device along a center axis. A mechanical force is also applied to the left tab of the first locking hinge device from an external, inward direction toward the hinge device along a center axis. These external forces are applied in opposite directions along the axis, toward a center of the hinge. In embodiments, the external forces may be applied by a thumb and finger of a hand of a user, compressing the hinge along the axis to dispose the hinge in the unlocked configuration. This permits the right locking gear to be disengaged with the right outer receiving gear and the left locking gear to be disengaged with the left outer locking gear, even though the splines of the two gears are aligned based on the orientation of the components 610,615 to which they are secured. Absent such an applied force, the first, left locking hinge device and the second, right locking hinge device would return to a first, locked configuration in accordance with a force applied by a biasing device of the system.

First component 610 includes a coupling element 630 as shown in FIG. 7. Coupling element 630 includes a receiver configured to receive a key. Coupling element 630 is configured to couple the first component 610 to another object, such as a camera. A key of a camera may be inserted and rotated within the coupling element 630 to secure the first component 610 to the camera.

In FIG. 8, the left drawing (A) shows the system unlocked with a twelve-degree opening between components 610 and 615. In this configuration, both left and right locking gears are unengaged with respective outer receiving gears. The locking gears have remained in a same relative configuration compared to the right drawing (B) of FIG. 7. Relative to the right drawing (B) of FIG. 7, this position may be obtained by having an external force be applied or continue to be applied to left and right hinge tabs of the first and second locking hinge devices while components 110 and 120 are adjusted, rotated, or otherwise moved out of a zero-degree relative opening angle. A rotational orientation of the left and right locking gears has not changed relative to the configurations shown in FIG. 7, even though a new opening angle has been obtained. The locking gears have remained engaged with the inner receiving gears throughout each configuration and position. An angular position of the locking gears has stayed consistent with component 615 to which it is secured by way of the inner receiving gears. A rotational orientation of the locking gears about a central axis relative to a second component 615 has not been altered between FIG. 7 and FIG. 8.

In FIG. 8, the right drawing (B) shows the system locked with a twelve-degree opening between components 110 and 120. In this configuration, the locking gear in the left locking hinge device is engaged with an outer receiving gear, while the locking gear in the right locking hinge device is engaged with its outer receiving gear. The locking gears are engaged with both inner receiving gears of the respective left and right locking hinge devices. The biasing device in this drawing is forcing each of the locking gears away from a center position and both locking gears can travel into the respective outer receiving gears. To change opening angles from this configuration, an external force would be required to be first applied to the left hinge tab and right hinge tab, which are each shown as extended an equal amount beyond an edge of component 610 in the right figure (B) of FIG. 8. In embodiments, other opening angles may be provided, including increments of angles associated with fifteen degrees, rather than twelve degrees.

In embodiments, once the components are rotated away from a relative angle at which each locking gear is aligned with an outer receiving gear, the external force no longer need be applied to a hinge tab. While rotation is continued, once a new opening angle associated with an aligned locking gear and an outer receiving gear is obtained, the biasing device may cause the aligned gears to be engaged. For example, once rotation has been applied to the unlocked configuration of the right figure (B) of FIG. 7, the external force need no longer be applied while components of the system are being rotated. Yet, once one or more locking gears and respective receiving gears are aligned at a next opening angle interval, these gears may automatically engage, resulting in a locked configuration such as shown in the right figure (B) of FIG. 8. As such, use of a biasing device according to various aspects of the present invention may decrease an extent of external force necessary to provide an adjusted opening angle for a system comprising one or more locking hinge devices according to various aspects of the present disclosure.

In FIG. 9, the left drawing (A) shows the system unlocked with a twenty-four-degree opening between components 610 and 615. In this configuration, both left and right locking gears are unengaged with respective outer receiving gears. The first portions of the locking gears are positioned within or proximate the outer receiving gears, but since the first portions do not have splines, the outer receiving gears and locking gears are not in physical contact and do not prevent rotation of the locking hinge devices or components of the system. Relative to the right drawing (B) of FIG. 8, this configuration may be obtained by having an external force be applied to the left and right hinge tabs of the first and second locking hinge devices while components 610 and 615 are moved from a twelve-degree opening angle. The external force may continue to be applied during rotation of components 610 and 615 to the position of drawing (A) of FIG. 9 or continue at least until rotation of the two components 610,615 has been initiated as discussed above. Such external forces may compress a biasing device. In this configuration in FIG. 9, an external force is applied to the left and right hinge tabs such that left and right locking gears are not engaged with respective left and right outer receiving gears, even though their splines are aligned and a force is applied by the biasing device to the locking gears. In the right drawing (B) of FIG. 9, this external force has been selectively removed from the hinge tabs and the biasing device has caused the aligned left and right locking gears and outer receiving gears to be engaged. Transitioning between the configurations shown in FIG. 9 may include selectively ending application of one or more external forces to the locking hinge devices along the central axis. When the one or more external forces are no longer applied, locking hinge devices may each lock, securing the system in a position with a selected opening angle as illustrated in the right drawing (B) of FIG. 9.

FIGS. 7-9 collectively show that the spacing between the locking gears is less than a first distance 910 when the components are rotatable. For example, a distance 915 between locking gears is greater in the right drawing (B) of FIG. 9 than in the left drawing (A) of FIG. 9. In embodiments, the first distance may be based on (e.g., corresponds to, etc.) a relative separation or distance along a central axis between opposite ends of first and second inner receiving gears. In embodiments, the first distance may correspond to a length of a barrel portion of a component along a central axis. When a spacing or distance 915 between outer edges of second portions of the locking gears is greater than this distance 910, the rotation of two components of a hinge is prevented. When a spacing between outer edges of second portions of the locking gears is equal or less than a distance between opposite ends of a barrel portion and/or inner receiving gears, the rotation of components 610, 615 is permitted.

As noted above, the use of two hinge devices, each comprising a separate set of gears, is optional. In embodiments, a hinge system may include a single hinge device. In other embodiments, a hinge may include at least two hinge devices, including three or more locking hinge devices or four or more locking hinge devices. In embodiments each of multiple locking hinge devices in a hinge may be disposed along a common central axis.

In embodiments according to various aspects of the present disclosure, an exact number of splines or teeth per gear is also optional or variable. For example, a gear may have ten splines, twelve splines, fifteen splines, eighteen splines, twenty splines, or more than twenty splines.

In embodiments according to various aspects of the present disclosure, a diameter of a gear is also optional or variable. For example, a locking hinge device may utilize a 0.233" diameter gear, though other diameters may be employed, including those that are equal or greater than 0.25 inches or equal or greater than 0.5 inches. A larger diameter gear may afford more circumference allowing for more fine tooth gears, which may provide a locking hinge device with higher fidelity or decreased angular interval between splines. A larger diameter may also enable larger coarse tooth gears. Larger coarse tooth gears may provide a higher strength relative to lower tooth gears. A smaller diameter may enable a hinge to be more compact and lighter in weight.

The choice of material for both the locking gears and the hinge components is also variable. For example, embodiments according to various aspects of the present disclosure may utilize an Acetal plastic or an ABS plastic composite for one or both of the locking gears and receiving gears. Different materials for different elements of a system may be used. Components and a hinge in a system may include plastic, metal, or other materials including composite materials and combinations of two or more materials.

As discussed elsewhere herein, a compression spring may be used as a biasing device in embodiments according to various aspects of the present disclosure to force a male or locking gear into hinge splines of a female or receiving gear that are aligned at a set angle. To change angle, each locking gear in a hinge may be pushed into a first barrel portion of a mount component, which may be a center barrel portion of a hinge, compressing the spring and causing splines of each locking gear to extend fully into splines of the center barrel portion of a hinge. Since splines of both locking gears are now inside the first or center barrel portion of a hinge and are not engaged with one or more splines of one or more adjoining outer or second barrel portions of a hinge, the first or center barrel portion of the hinge is free to rotate. Once a desired opening angle is achieved, each locking gear may be released, allowing the compression spring to force whichever locking gear spline that is aligned into an adjacent outer receiving gear of a hinge. A stop is provided on an outer hinge tab coupled to each locking gear, preventing each locking gear from fully disengaging the center hinge or barrel portion in response to the internal force, such that each locking gear will engage both the inner receiving gear splines in one barrel portion of a hinge and outer receiving gear splines in another barrel portion of the hinge. In embodiments, locking gears of two hinge devices may be centered in a hinge so that the same holding force is exerted on both hinge devices by a biasing device.

While embodiments of the invention have been illustrated and described, it will be appreciated that various changes can be made therein without departing from the spirit and scope of the invention. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. The term "may" indicates that an element or characteristic can be optional, including for purposes of excluding such an element or characteristic from embodiments of the invention. In the claims, the term "provided" is used to definitively identify an object that is not a claimed element of the invention but an object that performs the function of a workpiece that cooperates with the claimed invention.

The location indicators "herein", "hereunder", "above", "below", or other words that refer to a location, whether specific or general, shall be construed to refer to any location in the specification.

What is claimed is:

1. A locking hinge device, comprising:
a first gear with first splines configured to travel along an axis;
a second gear with second splines; and
a third gear with third splines configured to receive the first splines of the first gear, wherein a rotation of the locking hinge device about the axis is prevented when the first splines and the second splines are selectively engaged.

2. The device of claim 1, wherein the third splines prevent the first gear from rotating about the axis separately from the third gear.

3. The device of claim 1, wherein the first gear is configured to travel along the axis when the second splines are aligned with the third splines.

4. The device of claim 1, wherein the first gear is coupled to a first mount component via the third gear and the second gear is integrated with a second mount component.

5. The device of claim 1, comprising a biasing device, wherein a force is applied to a first end of the first gear along the axis in a first direction by the biasing device.

6. The device of claim 5, comprising a hinge tab provided at a second end of the first gear along the axis.

7. A locking hinge system, comprising:
a first mount component;
a second mount component; and
a locking hinge device including:
a first gear with first splines configured to travel along an axis;
a second gear with second splines; and
a third gear with third splines configured to receive the first splines of the first gear, wherein a rotation of the first mount component and the second mount component about the axis is prevented when the first splines and the second splines are selectively engaged.

8. The system of claim 7, wherein the first mount component is a camera mount component configured to couple to a camera and the second mount component is configured to couple to a clothing mount or a vehicle mount.

9. The system of claim 7, including a second locking hinge device comprising:
a fourth gear with fourth splines; and
a fifth gear with fifth splines, wherein rotation of the first mount component and the second mount component about the axis is prevented when the fourth splines and the fifth splines are selectively engaged.

10. The system of claim 9, wherein the second gear and the fifth gear are both physically integrated with one of the first mount component and the second mount component.

11. The system of claim 10, wherein the second splines are provided at a first angle about the axis and the fifth splines are provided at a second angle about the axis.

12. The system of claim 11, wherein the first angle is different from the second angle.

13. The system of claim 9, the first splines and the second splines are configured to be engaged at one or more first angles about the axis and the fourth splines and the fifth splines are configured to be engaged at one or more second angles about the axis, the first angles different from the second angles.

14. The system of claim 9, wherein the first gear and the fourth gear are configured to be:
separated along the axis by at least a first distance when the first splines and the second spines splines are selectively engaged or the fourth splines and the fifth splines are selectively engaged; and
separated along the axis by less than the first distance when both the first splines and the second splines are not selectively engaged and the fourth splines and the fifth splines are not selectively engaged.

15. The system of claim 9, wherein the second locking hinge device includes a sixth gear with sixth splines engaged with the fourth splines.

16. The system of claim 15, wherein the third gear and the sixth gear are both physically integrated with one of the second mount component and the first mount component.

17. The system of claim 15, wherein the second splines and the fifth splines are aligned with each other about the axis and the third splines and the sixth splines are aligned with each other about the axis.

18. The system of claim 9, comprising a biasing device along the axis, positioned to provide a force along the axis to each of the first gear and the fourth gear.

19. A locking hinge system for a camera mount, comprising:
a first mount component configured to be coupled to a camera;
a second mount component configured to be coupled to one of a clothing mount and a vehicle mount;
a first locking hinge device including:
a first locking gear configured to travel along an axis; and a first receiving gear including a first concave region, the first concave region configured to receive the first locking gear to selectively engage the first locking gear, wherein rotation of the first mount component and the second mount component about the axis is prevented when the first locking gear and first receiving gear are selectively engaged; and a second locking hinge device including:
  a second locking gear configured to travel along the axis; and
  a second receiving gear including a second concave region, the second concave region configured to receive the second locking gear to selectively engage the second locking gear, wherein rotation of the first mount component and the second mount component about the axis is prevented when the second locking gear and second receiving gear are selectively engaged.

20. The locking hinge system of claim 19, wherein the first locking gear is configured to selectively engage the first receiving gear in a first direction along the axis and the second locking gear is configured to selectively engage the second receiving gear in a second direction along the axis, the first direction opposite the second direction.

* * * * *